United States Patent
Pesavento et al.

(10) Patent No.: US 9,875,512 B2
(45) Date of Patent: Jan. 23, 2018

(54) PHOTO AND VIDEO SHARING

(71) Applicant: Yahoo! Inc., Sunnyvale, CA (US)

(72) Inventors: Gerry Pesavento, Orinda, CA (US); Andrew Stadlen, San Francisco, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 85 days.

(21) Appl. No.: 14/290,223

(22) Filed: May 29, 2014

(65) Prior Publication Data

US 2014/0359015 A1 Dec. 4, 2014

Related U.S. Application Data

(60) Provisional application No. 61/830,227, filed on Jun. 3, 2013, provisional application No. 61/830,229, filed on Jun. 3, 2013.

(51) Int. Cl.
*H04L 29/08* (2006.01)
*G06Q 50/00* (2012.01)
*G06F 17/30* (2006.01)

(52) U.S. Cl.
CPC ....... *G06Q 50/01* (2013.01); *G06F 17/30268* (2013.01)

(58) Field of Classification Search
CPC ... G06Q 10/107; G06Q 10/10; G06F 17/3089
See application file for complete search history.

(56) References Cited

U.S. PATENT DOCUMENTS

| 7,685,198 | B2 * | 3/2010 | Xu | G06F 17/241 |
| | | | | 707/748 |
| 7,788,247 | B2 * | 8/2010 | Wang | G06F 17/3089 |
| | | | | 707/705 |
| 7,953,796 | B2 | 5/2011 | Brush et al. | |
| 8,031,170 | B2 | 10/2011 | Brown et al. | |
| 8,341,219 | B1 | 12/2012 | Young | |
| 9,727,565 | B2 | 8/2017 | Pesavento et al. | |

(Continued)

FOREIGN PATENT DOCUMENTS

| CN | 102763105 | 10/2012 |
| TW | 201303612 | 1/2013 |

OTHER PUBLICATIONS

Wikipedia, "Computer Vision," page last modified May 8, 2014, downloaded from http://en.wikipedia.org/wiki/Computer_vision.

(Continued)

*Primary Examiner* — Ranodhi Serrao
(74) *Attorney, Agent, or Firm* — Weaver Austin Villeneuve Sampson LLP

(57) ABSTRACT

In one embodiment, a set of tags associated with a media item may be ascertained. One or more of a plurality of individuals may be identified based, at least in part, upon the set of tags associated with the media item and a plurality of sets of sharing preferences, each one of the plurality of sets of sharing preferences being associated with a corresponding one of the plurality of individuals and indicating tags for which media items are to be automatically shared with the corresponding one of the plurality of individuals. Information pertaining to the media item may be shared with the identified individuals.

20 Claims, 17 Drawing Sheets

(56) References Cited

U.S. PATENT DOCUMENTS

| | | | |
|---|---|---|---|
| 2002/0080256 A1 | 6/2002 | Bates | |
| 2007/0173956 A1 | 7/2007 | Koch et al. | |
| 2009/0094189 A1* | 4/2009 | Stephens | G06F 17/30864 |
| 2009/0192998 A1* | 7/2009 | Paulsen | G06F 17/30 |
| 2009/0234935 A1* | 9/2009 | Watson | H04L 12/1822 709/219 |
| 2009/0254614 A1* | 10/2009 | Brush | H04N 21/4788 709/204 |
| 2010/0241739 A1 | 9/2010 | Reus et al. | |
| 2010/0268682 A1* | 10/2010 | Lewis | G06Q 10/107 706/54 |
| 2011/0026835 A1 | 2/2011 | Ptucha et al. | |
| 2011/0208722 A1 | 8/2011 | Hannuksela | |
| 2012/0066286 A1 | 3/2012 | Heredia et al. | |
| 2012/0124034 A1 | 5/2012 | Jing et al. | |
| 2012/0131032 A1 | 5/2012 | Rakshit | |
| 2013/0212529 A1 | 8/2013 | Amarnath | |
| 2013/0250139 A1 | 9/2013 | Doan | |
| 2014/0355907 A1 | 12/2014 | Pesavento et al. | |

OTHER PUBLICATIONS

Facebook, "How Sharing Works," Facebook © 2014, downloaded from https://www.facebook.com/about/sharing.
WO patent application No. PCT/US14/39197, International Search Report and Written Opinion dated Sep. 24, 2014.
WO patent application No. PCT/US14/39218, International Search Report and Written Opinion dated Sep. 24, 2014.
U.S. Appl. No. 14/290,214, Office Action dated Jun. 18, 2015.
U.S. Appl. No. 14/290,214, Office Action dated Jan. 20, 2016.
TW patent application No. 103118543, Office Action dated Oct. 23, 2015.
TW patent application No. 103118363, Office Action dated Dec. 10, 2015.
U.S. Appl. No. 14/290,214, Office Action dated May 13, 2016.
TW patent application No. 103118543, Notice of Allowance dated Feb. 24, 2016.
TW patent application No. 103118363, Decision of Rejection dated Mar. 25, 2016.
U.S. Appl. No. 14/290,214, Office Action dated Nov. 16, 2016.
TW patent application No. 105109391, Office Action dated Aug. 8, 2016.
U.S. Appl. No. 14/290,214, Notice of Allowance dated Apr. 3, 2017.
WO patent application No. PCT/US14/39197, International Preliminary Report on Patentability and Written Opinion dated Dec. 8, 2015.
WO patent application No. PCT/US14/39218, International Preliminary Report on Patentability and Written Opinion dated Dec. 8, 2015.

* cited by examiner

400

| Set of individuals 402 | Tags 404 |
|---|---|
| richard egan | sailing, sail boat, ocean, beach |
| mary thompson | sara jones |
| leroy jenkins | world of Warcraft |
| francois sacrebleu | paris |
| peter jones, mike soderstrom | hang gliding, hang glider, flying |

FIG. 3E similarity tag processor photo  similar photo user tag: eiger similarity weight: 0.85,
tag: eiger 0.85 self scene learning photo    user tag: hang glider scene training module from user tags

PHOTO AND VIDEO SHARING

RELATED APPLICATIONS

This application claims priority from U.S. Provisional Application No. 61/830,227, entitled "Photo and Video Search," by Pesavento et al, filed on Jun. 3, 2013, which is incorporated herein by reference in its entirety and for all purposes.

This application also claims priority from U.S. Provisional Application No. 61/830,229, entitled "Photo and Video Sharing," by Pesavento et al, filed on Jun. 3, 2013, which is incorporated herein by reference in its entirety and for all purposes.

BACKGROUND OF THE INVENTION

The disclosed embodiments relate generally to computer-implemented methods and apparatus for performing targeted sharing of media items.

With the proliferation of mobile devices such as smartphones and tablets, media such as photos and videos are being collected in increasing volumes. Users often store their photos and videos on their computers and mobile devices, as well as upload their photos and videos for storage via a number of services and websites. To share their photos and videos, users may manually select and post a selected photo or video to a social network or media sharing site.

Generally, when a user shares a media item such as a photo or video via a social network or media sharing site, the media item is shared in a flat manner. The person doing the sharing has to take manual steps, and the person viewing their social feeds cannot control the visual content. More particularly, the media item may be manually placed in a circle of friends or shared among all friends via a user-initiated feed.

SUMMARY OF THE INVENTION

The disclosed embodiments support the targeted sharing of media items such as visual media items. Visual media items may include, but are not limited to, photos and videos.

In one embodiment, a set of tags associated with a media item may be ascertained. One or more of a plurality of sets of individuals may be identified based, at least in part, upon the set of tags associated with the media item and a plurality of sets of sharing preferences, where each one of the plurality of sets of sharing preferences is associated with a corresponding one of the plurality of sets of individuals and indicates tags for which media items are to be shared with the corresponding one of the plurality of sets of individuals. Information pertaining to the media item may be transmitted to the identified sets of individuals.

In another embodiment, a set of sharing preferences associated with a set of one or more individuals may be obtained, where the set of sharing preferences indicates tags for which media items are to be shared with the set of one or more individuals. One or more of a plurality of media items may be identified based, at least in part, upon the set of sharing preferences and tags associated with the plurality of media items. Information pertaining to the identified media items may be transmitted to the set of one or more individuals.

In yet another embodiment, a set of tags associated with a media item may be ascertained. It may be determined whether to share the media item with a particular set of one or more individuals based, at least in part, upon the set of tags associated with the media item and a set of sharing preferences associated with the set of individuals, where the set of sharing preferences indicate tags for which media items are to be shared with the set of individuals. Information pertaining to the media item may be transmitted to the set of individuals according to a result of the determination.

In another embodiment, the invention pertains to a device comprising a processor, memory, and a display. The processor and memory are configured to perform one or more of the above described method operations. In another embodiment, the above described method operations may be performed during a streaming process from a client to a server. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 3E is a diagram illustrating an example table that may be implemented to track sharing preferences in accordance with various embodiments.

DETAILED DESCRIPTION OF THE SPECIFIC EMBODIMENTS

Figure 1:
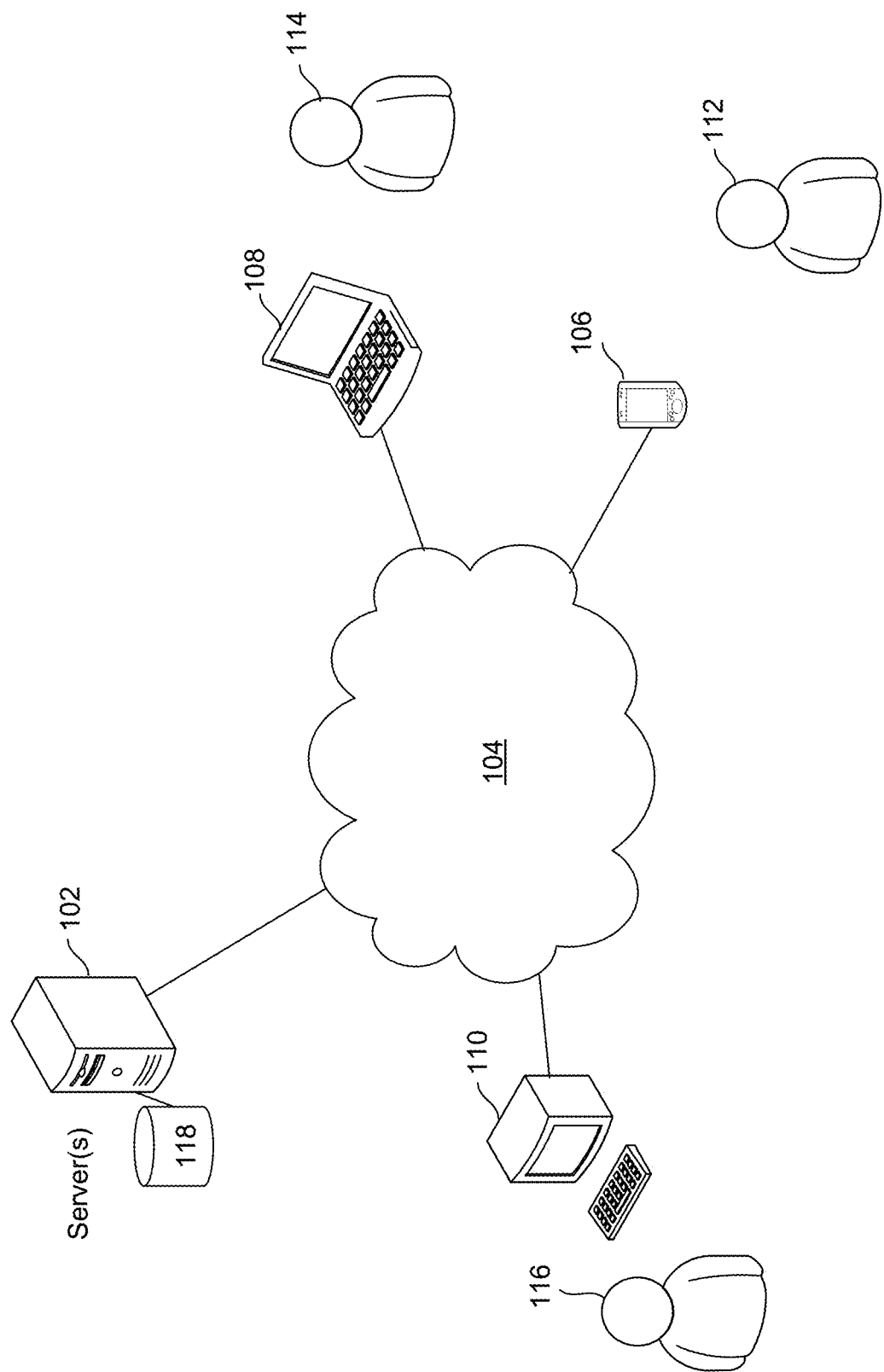
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Digital media such as visual media may be tagged manually. More particularly, users may tag a given media item with one or more tags (i.e., labels). Each tag may include text that pertains to the media item. For example, the text may include a title or category. However, many users do not have the time to dedicate or may choose not to dedicate time to tagging their media. As a result, the tags for many media items may be incomplete or missing entirely.

Even where media items are tagged, the ability to search for media items is limited by the accuracy with which the media items are tagged. Often, searching the media items can require a user to scroll through thousands of media items. Accordingly, users are often frustrated with the limited ability to search and browse media items.

Many services and web sites are available for sharing media items such as visual media items. However, due to the lack of tags, visual media items cannot easily be grouped by topics such as scene, object, person, text, concept, mood, venue, visual attributes, or event. Accordingly, users cannot easily identify visual media items that they might otherwise wish to share with others.

Many users choose to share media items such as visual media items via services or web sites such as social networking web sites. However, users typically have a diverse group of friends, each with multiple interests. Unfortunately, it is currently impossible to provide a targeted stream of media items based on the content of those items to specific friends via these services or web sites. Furthermore, users receiving the shared media items via these services or web sites often find the amount of media items to be cumbersome and the content of many of the media items to be unrelated to their interests.

In accordance with various embodiments, targeted sharing of media such as visual media may be supported. The targeted sharing of media may be performed based, at least in part, upon tags associated with the media and one or more sets of sharing preferences. Each set of sharing preferences may indicate tags for which media items are to be shared with a corresponding set of one or more individuals. Sharing of a media item may include transmitting information pertaining to the media item, and therefore may include the media item, a hypertext link providing access to the media item, or a notification of a location or identifier of the media item. The sharing of media items may be performed automatically, or may be initiated in response to a request from a user.

In some embodiments, metadata may be generated or refined to facilitate the targeted sharing of media items such as visual media items. More particularly, through an automated tagging process, metadata including a set of tags may be generated or refined for a particular media item. In this manner, a media item may be associated with metadata including a set of one or more tags.

Media items processed as disclosed herein may include items such as visual media items, audio files (e.g., songs or audio clips), and/or text files (e.g., articles). In a specific embodiment, the media items include visual media items.

An electronic visual media item may include one or more digital images. For example, an electronic visual media item may include a video, photograph (i.e., photo), or electronically generated image such as a diagram or chart. A photo generally includes a visual image, while a video generally includes moving visual images. For example, a video may include a movie or a video clip. An electronic visual media item may be stored in the form of a file in a suitable format.

Visual media items may be captured by a camera of a mobile device, which may also be referred to as a portable device, a wearable device, or a handheld device. For example, photos and videos may be generated in a digital format using a digital camera. Alternatively, photos and videos that were not initially generated in a digital format may be converted to a digital format.

Various embodiments may be implemented, at least in part, by a mobile device and/or a remotely located server that is located in a remote location with respect to the mobile device. Examples of a mobile device include, but are not limited to, a cellular telephone, a smart phone, a camera, a video recorder, a display pager, a Personal Digital Assistant (PDA), a handheld computer, a tablet computer, and a laptop computer.

Example System

FIG. 1 is a diagram illustrating an example system in which various embodiments may be implemented. As shown in FIG. 1, the system may include one or more servers 102. In accordance with various embodiments, the servers 102 may be associated with a web site such as a social networking web site. Examples of social networking web sites include Yahoo, Google+, Facebook, Tumblr, LinkedIn, Flickr, and Instagram. The server(s) 102 may enable the web site to provide a variety of services to its users. More particularly, users of the web site may perform activities such as access user accounts or public user profiles, interact with other members of the web site, transmit messages, upload media such as visual media (e.g., photographs, videos), perform targeted sharing of media such as visual media, purchase goods or services, access information or content posted on the web site, etc.

The targeted sharing of media such as visual media may be facilitated via the server(s) 102 by transmitting information pertaining to one or more media items over the Internet 104 to one or more client devices 106, 108, 110 in association with corresponding users 112, 114, 116, respectively. In other embodiments, the targeted sharing of media may be accomplished by transmitting the information directly from one of the devices 106, 108, 110 to another one of the devices 106, 108, 110. More particularly, the sharing of media may be performed according to sharing preferences associated with the users 112, 114, 116. The sharing preferences and media may be maintained locally at the devices 106, 108, 110 and/or at the server(s) 102.

The information that is transmitted may include or pertain to one or more media items. While the media items may include visual media items such as photos or videos, it is important to note that the examples described herein are merely illustrative. Therefore, other types of media items such as audio files or text files may also be "shared" in accordance with the disclosed embodiments.

The targeted sharing of media may be performed automatically or may be initiated in response to a user request. More particularly, the user request may be received from a user who wishes to receive media that satisfies a corresponding set of sharing preferences. Alternatively, the user request may be received from an owner of the media being shared.

In accordance with various embodiments, each set of one or more individuals may have an associated set of sharing preferences that indicates one or more tags for which media items such as visual media items are to be shared with the set of individuals. One or more sets of sharing preferences may be stored locally at one or more of the devices 106, 108, 110. Alternatively, a plurality of sets of sharing preferences may be stored in one or more data stores 118 that are coupled to the server(s) 102. Each of the data stores 118 may include one or more memories.

A set of sharing preferences associated with a set of one or more individuals may be updated in response to a request. Such a request may be received and processed by the server(s) 102 and/or one of the devices 106, 108, 110. The request may be received from an owner of a set of media to which the set of sharing preferences are to be applied. Alternatively, the set of sharing preferences may be updated in response to a request from a user who wishes to receive media that satisfies the set of sharing preferences.

If the owner of the media establishes a set of sharing preferences for other individual(s), the other individual(s) may negate at least a portion of the set of sharing preferences. More particularly, the individual(s) may block the receipt of media items that have been transmitted according to the set of sharing preferences (or portion thereof). Alternatively, the individual(s) may negate the set of sharing preferences or portion thereof by further modifying or deleting the set of sharing preferences.

The devices 106, 108, 110 may include a computer or a mobile device such as a tablet or cell phone. Many mobile devices include a camera for capturing visual media items such as photos or videos. In some embodiments, the targeted sharing of a visual media item may be performed automatically upon the capture or tagging of the visual media item by a mobile device or the uploading of the visual media item by the mobile device to the server(s) 102.

The server(s) 102 and/or device(s) 106, 108, 110 may facilitate the targeted sharing of media content, either automatically or in response to requests. More particularly, media items or information associated therewith may be transmitted to the pertinent individuals via a web site such as a social networking web site, electronic mail, text message, a media sharing application, or other suitable mechanism. A media sharing application may be installed on a sending device to support the sharing of media and/or installed on a receiving device to support the receipt of information pertaining to shared media from the sending device. In some embodiments, the individuals that receive the media items or information associated therewith may be members or users of the web site.

A media sharing application may be installed and executed via the server(s) 102 and/or a client device 106, 108, 110. The media sharing application may be implemented on any number of servers although a single server is illustrated for clarity.

To facilitate the sharing of media items, the media items may be automatically tagged with a set of tags. Sharing of the media items may then be performed based, at least in part, upon associated tags, which may include the automatically generated tags. Of course, tags associated with media items may also include manually generated tags. Various methods and mechanisms for performing automated tagging will be described in further detail below.

Embodiments disclosed herein may be implemented via the server(s) 102 and/or the client devices 106, 108, 110. For example, various features may be implemented via a media sharing application on the client devices 106, 108, 110. The disclosed embodiments may be implemented via software and/or hardware.

The disclosed embodiments enable media items such as visual media items to be shared with users. More particularly, the server(s) 102 and/or client devices 106, 108, 110 may provide information pertaining to media items to users via the web site (e.g., via display on a web page of the web site), via electronic mail, Short Message Service (SMS), via a mobile device (e.g., text message), or via another medium such as digital television, which may be connected to the Internet.

Figure 2:
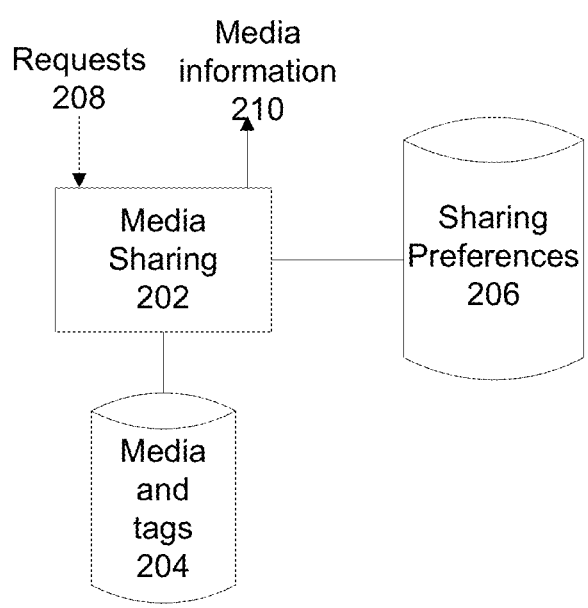
FIG. 2 is a block diagram illustrating an example system in which media sharing may be implemented in accordance with various embodiments.

FIG. 2 is a block diagram illustrating an example system in which media sharing may be implemented in accordance with various embodiments. As shown in this example, a media sharing system 202 may have access to a set of media items and associated tags 204. For example, the set of media items may include media items stored on a particular client device such as a mobile device and/or server(s), media items maintained by a particular web site or service, media items maintained in particular folder(s), and/or media items maintained by a particular user or user account. The media sharing system 202 may be implemented at client device(s) such as mobile device(s) and/or remotely located server(s).

The media sharing system 202 may have access to sharing preferences 206. The sharing preferences 206 may include one or more sets of sharing preferences, where each set of sharing preferences is associated with a corresponding set of one or more individuals. Each set of sharing preferences may indicate tags for which media items or information associated therewith is to be transmitted to a corresponding set of individuals.

A set of sharing preferences associated with a particular set of individuals may be applied globally to all media items. Alternatively, the set of sharing preferences may be applied to a particular set of media items. For example, the set of media items may be owned by a particular individual, stored on a particular device, saved in a particular location or folder, maintained by a particular web site or service, and/or maintained by a particular user account.

The media sharing system 202 may initiate media sharing automatically. For example, media sharing may be performed automatically upon capturing, tagging, or uploading a media item.

In addition, the media sharing system 202 may initiate media sharing in response to requests 208. For example, one of the requests 208 may initiate media sharing directed to a particular set of individuals. As another example, one of the requests 208 may initiate media sharing for a particular source of media. Example media sources include, but are not limited to, a particular web site or service, a user account on web site in which media is maintained, a client device, or a specific folder on a client device.

The requests 208 may also include requests to update the sharing preferences 206. Requests 208 to update the sharing preferences 206 may be initiated by one of the set of individuals that wishes to receive media according to the corresponding set of preferences. In addition, the requests 208 to update the sharing preferences 206 may be initiated by a user whose media is to be shared.

The media sharing system 202 may transmit information pertaining to one or more media items satisfying a set of sharing preferences to a corresponding set of individuals. More particularly, information such as one or more media items or a notification thereof may be transmitted to the set of individuals based, at least in part, upon the set of sharing preferences and tags associated with the set of media items.

In addition, the media sharing system 202 may transmit information pertaining to a particular media item to set(s) of individuals that are identified based, at least in part, upon the sharing preferences 206 for various sets of individuals and tags associated with the particular media item. For example, the transmission pertaining to a particular media item may be performed automatically at the time that the media item is captured, uploaded, or tagged.

The information transmitted by the media sharing system 202 may include the media item, a hypertext link, or other form of notification. The information may be transmitted via electronic mail to electronic mail address(es), text message(s), a media sharing application, a social networking web site, Internet television, or another suitable mechanism. In some embodiments, the information may include a plurality of media items. For example, a feed of media items may be transmitted via a social networking web site or directly to a mobile device.

Figure 3A:
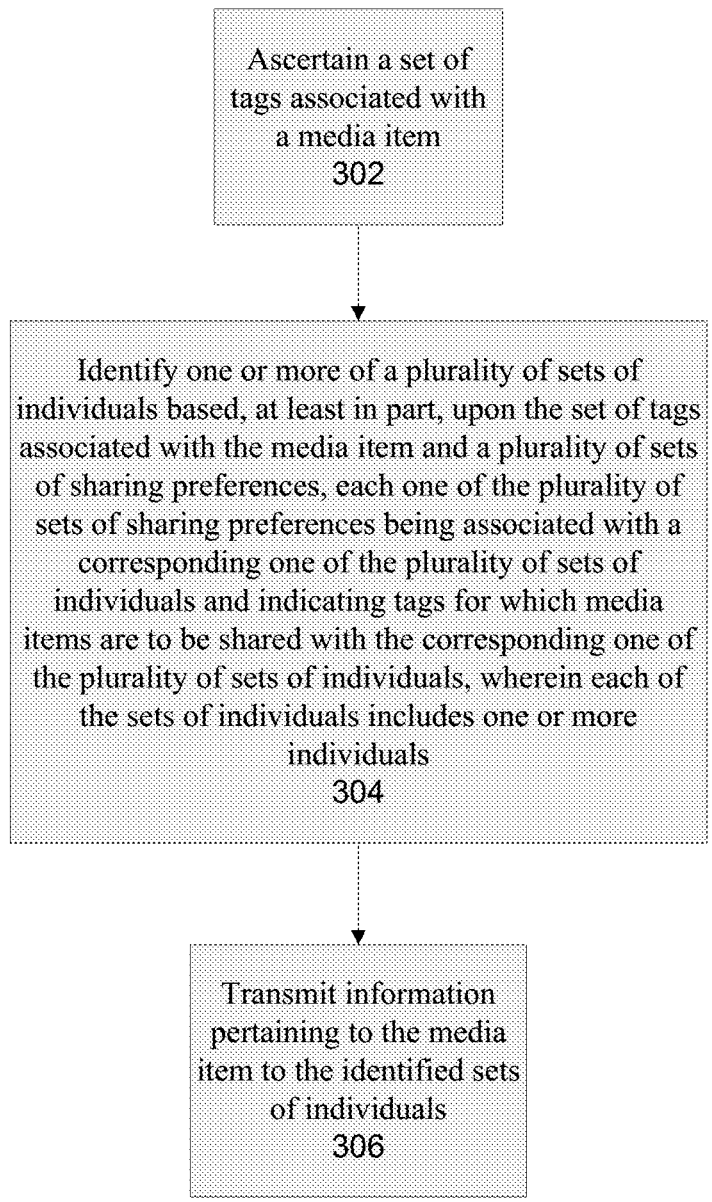
FIG. 3A is a process flow diagram illustrating an example method of performing targeted sharing of media items in accordance with various embodiments.

FIG. 3A is a process flow diagram illustrating an example method of performing targeted sharing of media items in accordance with various embodiments. A set of tags associated with a particular media item may be ascertained at 302. More particularly, the set of tags may be generated or retrieved from storage. More particularly, the set of tags or a portion thereof may be automatically generated or manually generated. For example, input may be received via a user interface, where the input indicates one or more tags associated with the media item.

One or more of a plurality of sets of one or more individuals may be identified at 304 based, at least in part, upon the set of tags associated with the media item and a plurality of sets of sharing preferences. More particularly, each one of the plurality of sets of sharing preferences may be associated with a corresponding one of the plurality of sets of individuals and may indicate tags for which media items are to be shared with the corresponding one of the plurality of sets of individuals. A look up may be performed to identify one or more of the plurality of sets of sharing preferences identifying tags that match or otherwise pertain to the set of tags of the particular media item. The one or more of the plurality of sets of individuals that are mapped to the identified sets of sharing preferences may be identified.

Information pertaining to the media item may be transmitted to the identified sets of individuals at 306. More particularly, the information may include the media item, a hypertext link providing access to the media item, or a notification pertaining to the media item. The information may be transmitted to the identified sets of individuals via electronic mail to electronic mail address(es), text message(s), a media sharing application, a social networking web site, Internet television, or another suitable mechanism.

Figure 3B:
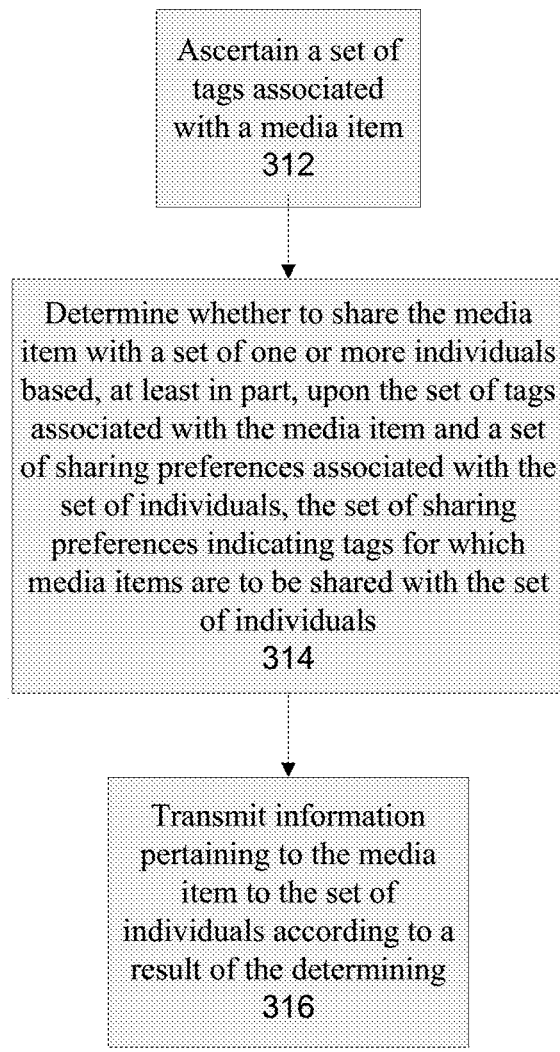
FIG. 3B is a process flow diagram illustrating another example method of performing targeted sharing of media items in accordance with various embodiments.

FIG. 3B is a process flow diagram illustrating another example method of performing targeted sharing of media items in accordance with various embodiments. A set of tags associated with a media item may be ascertained at 302. It may be determined whether to share the media item with a particular set of one or more individuals at 304 based, at least in part, upon the set of tags associated with the media item and a set of sharing preferences associated with the set of individuals, where the set of sharing preferences indicates tags for which media items are to be shared with the set of individuals. Information pertaining to the media item may be transmitted to the set of individuals at 306 according to a result of the determining. More particularly, the information may be transmitted if the set of sharing preferences indicate that the media item is to be shared with the set of individuals. The information may include the media item, a hypertext link, or other form of notification. The information may be transmitted via electronic mail to electronic mail address(es), text message(s), a media sharing application, a social networking web site, Internet television, or another suitable mechanism.

The targeted sharing process of FIGS. 3A and 3B may be performed automatically. For example, the targeted sharing process may be performed automatically at the time that the media item is captured, tagged, or uploaded. Thus, the targeted sharing process may be initiated in response to capturing, uploading, or tagging the media item.

Alternatively, the targeted sharing process may be performed in response to a request. The request may be received from an owner of the media item or mobile device via which the media item is captured. For example, the request may be received via a graphical user interface presented via a server or client device.

Figure 3C:
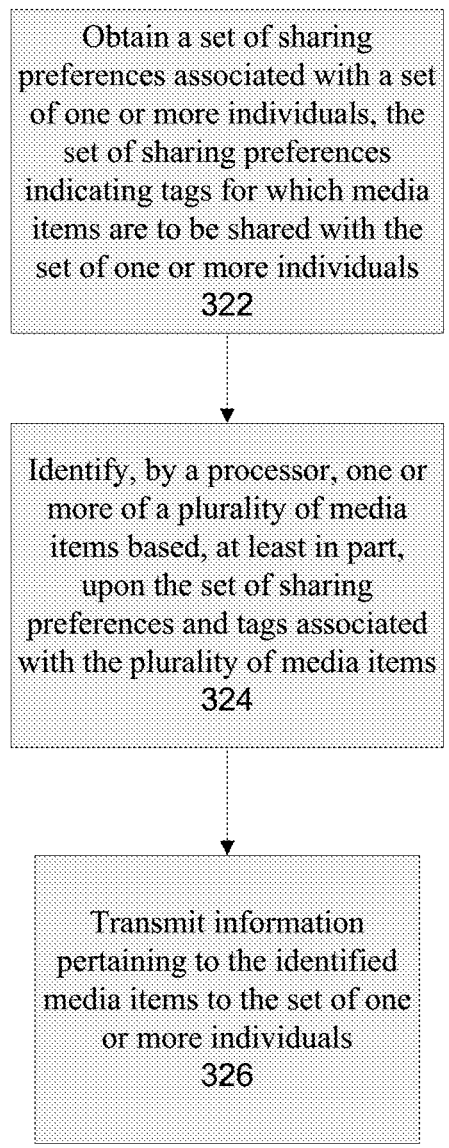
FIG. 3C is a process flow diagram illustrating another example method of performing targeted sharing of media items in accordance with various embodiments.

FIG. 3C is a process flow diagram illustrating another example method of performing targeted sharing of media items in accordance with various embodiments. A set of sharing preferences associated with a set of one or more individuals may be obtained at 322, where the set of sharing preferences indicates tags for which media items are to be shared with the set of one or more individuals. One or more of a plurality of media items may be identified at 324 based, at least in part, upon the set of sharing preferences and tags associated with the plurality of media items. Information pertaining to the identified media items may be transmitted at 326 to the set of one or more individuals. The information may include the media item, a hypertext link, or other form of notification. The information may be transmitted via electronic mail to electronic mail address(es), text message(s), a media sharing application, a social networking web site, Internet television, or another suitable mechanism.

The targeted sharing process of FIG. 3C may be performed automatically. For example, the targeted sharing process may be performed periodically or at a pre-determined time. Alternatively, the targeted sharing process may be performed in response to a request. The request may be received from an owner of the media item or mobile device via which the media item is captured. For example, the request may be received via a graphical user interface presented via a server or client device. Alternatively, the request may be received from an individual in the set of individuals. For example, the request may be received via a graphical user interface presented via a server. As another example, the request may be received via a message transmitted via a mobile device of the individual.

The sharing preferences may be updated by an owner of the media item(s) to be shared. For example, the owner of the media item(s) or associated account may manually update the sharing preferences via a graphical user interface. This enables the owner of the media item(s) to have precise control of the media items that they want to share. In addition, a set of sharing preferences may be updated by an individual associated with the set of sharing preferences. Therefore, the sharing preferences may be updated in response to a share request submitted by an owner or another individual.

A share request may be received in the form of a message. For example, a message may be transmitted from one mobile device to another mobile device over a wireless network. Alternatively, a share request may be received via a graphical user interface. For example, input may be received via a graphical user interface, and one of the plurality of sets of sharing preferences may be updated based, at least in part, upon the input received via the graphical user interface.

Figure 3D:
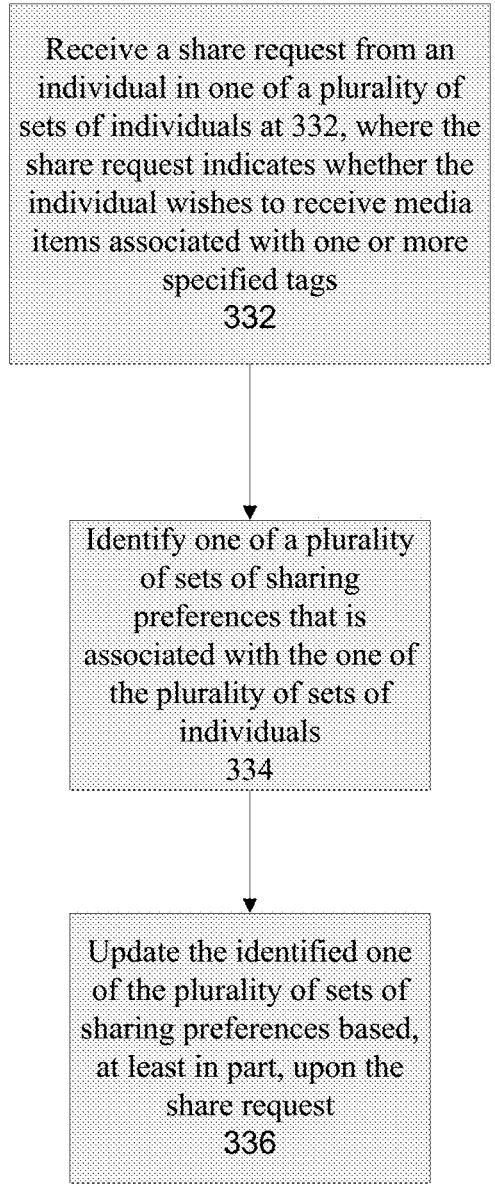
FIG. 3D is a process flow diagram illustrating an example method of updating sharing preferences associated with an individual in response to a request received from the individual in accordance with various embodiments.

FIG. 3D is a process flow diagram illustrating an example method of updating sharing preferences associated with an individual in response to a share request received from the individual in accordance with various embodiments. A share request may be received from an individual in one of a plurality of sets of individuals at 332, where the share request indicates whether the individual wishes to receive media items associated with one or more specified tags. More particularly, the share request may indicate that the individual wishes or does not wish to receive media items associated with the one or more specified tags. In this manner, individuals may have precise control of the media feeds that they receive.

One of a plurality of sets of sharing preferences that is associated with the one of the plurality of sets of individuals may be identified by a processor at 334. For example, a look up may be performed in a table or database to identify a set of sharing preferences corresponding to the individual (e.g., by looking up an individual or a group identifier).

The identified one of the plurality of sets of sharing preferences may be updated at 336 based, at least in part, upon the share request. The updating of the set of sharing preferences may include adding a tag or deleting a tag. In some embodiments, the updating of the set of sharing preferences may include modifying a sharing indicator associated with a tag. A sharing indicator may indicate that media items associated with corresponding tag(s) are to be shared with the sets of individuals or, alternatively, may indicate that media items associated with the corresponding tag(s) are not to be shared with the set of individuals. A sharing indicator may be associated with one or more tags. For example, a first sharing indicator "share" may be associated with tags "swimming" and "ocean," while a second sharing indicator "do not share" may be associated with tag "fishing."

A share request may be received via a graphical user interface or a message transmitted by a device such as a mobile device. A message may include one or more share requests. The share request may be received by a server or another mobile device (e.g., the mobile device of the owner of the media to be shared). In one embodiment, both a sending mobile device and a receiving mobile device implement a media sharing application, enabling the sending mobile device and the receiving mobile device to communicate regarding sharing preferences and shared media items.

The processes of FIG. 3A-FIG. 3C may be performed by a client device, and/or one or more servers. For example, the processes may be performed during a streaming process. An example client device will be described in further detail below.

The disclosed embodiments may be implemented to support the targeted sharing of various types of media items. The media items may include, but are not limited to, visual media items, audio media items, text media items, or other files. The media items may be maintained in various types of formats.

Sharing preferences of one or more sets of individuals may be maintained in a table or other suitable data structure. Each set of individuals may include one or more individuals.

FIG. 3E is a diagram illustrating an example table that may be implemented to track sharing preferences in accordance with various embodiments. In this example, each separate set of sharing preferences is designated by a separate horizontal entry in a sharing table 400. Each set of sharing preferences is associated with a corresponding set of individuals 402, as shown in the first column of the sharing table 400. Each separate set of individuals may include one or more individuals, who may be, for example, a friend, co-worker, relative, or acquaintance of a user. A set of individuals may also include a group with common interest.

By maintaining a set of sharing preferences for each set of individuals 402, it is possible to maintain a record of the interests of each set of individuals. In this example, the set of sharing preferences for Richard Egan indicates that Richard Egan is interested in "sailing," "sail boat," "ocean," and "beach." Similarly, the set of sharing preferences for both Peter Jones and Mike Soderstrom indicate that their interests include "hang gliding," "hang glider," and "flying." Therefore, media items or information associated therewith may be transmitted to individuals that are interested in the media items, while eliminating the transmission of media items or information associated therewith to individuals would not be interested in those media items.

By performing a lookup for an individual in the sharing table 400, the media sharing system may determine the interests of the individual. The media sharing system may then identify those media items that would be of interest to the individual. Similarly, by performing a lookup for a particular tag of a media item in the sharing table, the media sharing system may identify those individuals who are interested in media items that are tagged with the particular tag.

Each set of sharing preferences may indicate one or more tags for which media items are to be shared with the corresponding set of individuals. In some embodiments, a set of sharing preferences may include one or more sharing indicators, which may include or indicate that media items associated with corresponding tag(s) are to be shared with the sets of individuals or, alternatively, may indicate that media items associated with the corresponding tag(s) are not to be shared with the set of individuals. A sharing indicator may be associated with one or more tags. In some embodiments, a sharing indicator may be implicit in the existence or absence of a tag in a set of sharing preferences. For example, a list of one or more tags in a set of sharing preferences may imply that media items associated with the (e.g., tagged with) corresponding tag(s) are to be shared with the set of individuals. Similarly, the exclusion of a specific tag from the list of tags may imply that media items associated with (e.g., tagged with) the specific tag is to be excluded from media items that are shared with the set of individuals. For example, a user may wish to receive photos from their friends that are labeled "motorcycle," but may not wish to receive photos of their cat.

In this example, each set of sharing preferences may map a corresponding set of individuals 402 to a set of one or more tags 404 for which media items are to be shared with the corresponding set of individuals. For example, the set of sharing preferences may indicate that media items pertaining to the set of tags 404 are to be automatically shared with the corresponding set of individuals. In this manner, targeted media sharing may be performed in real-time without manual curation.

In some embodiments, media items that have at least one tag that matches a tag in the set of tags 404 may be shared with the corresponding set of individuals 402. In other embodiments, media items having tags that match all of the tags in the set of tags 404 may be shared with the corresponding set of individuals 402. In yet other embodiments, media items having tags that match a majority of the tags in the set of tags 404 may be shared with the corresponding set of individuals 402. In yet other embodiments, a set of sharing preferences for a set of individuals 402 may include an indication of the number of tags in the set of tags 404 that is to be present in a media item's tags for the media item to be shared with the set of individuals.

In this example, the set of tags 404 for which media items are to be shared with the corresponding set of individuals 402 may be designated by a list of tag(s). However, it is important to note that this example is merely illustrative. Thus, the set of tags 404 may also be designated via another mechanism such as one or more rules. For example, a set of sharing preferences may indicate via a rule that media items having tags "ocean" and "water skiing" but not having tag "surfing" are to be shared with the corresponding set of individuals.

Although not shown in this example, a set of sharing preferences may further indicate a number of media items to be shared with the corresponding set of individuals. More particularly, a set of sharing preferences may indicate a specific number of media items to be shared with the set of individuals. Alternatively, a set of sharing preferences may indicate a maximum threshold number of media items to be shared with the set of individuals. Where the number of media items to be shared is limited by a set of sharing preferences, the media sharing system may rank the media items according to relevance to the set of sharing preferences (or other user data) and select the top ranked media items.

Furthermore, a set of sharing preferences may indicate a time or periodicity at which media items are to be shared with the set of individuals. For example, a set of sharing preferences may indicate that media items are to be shared automatically on a weekly or daily basis. As another example, a set of sharing preferences may indicate that 5 media items are to be shared daily.

In this example, the sharing preferences are maintained at the device or system from which media items or information associated therewith is transmitted. However, it is possible that an individual is mapped to a particular set of tags, but the individual does not wish to receive media items that are tagged with the particular set of tags. For example, user A may elect to share all beach photos with user B, but user B may only wish to see beach photos that also include a sunset. Thus, user B can exclude all beach photos that do not include a sunset from his or her media item feed. For example, user B may submit or transmit a sharing request to revise the set of sharing preferences associated with user B to accurately reflect the interests of user B. As another example, user B may choose to block those media items that have been shared by user A. Thus, a user may maintain a set of receiving preferences on his or her client device or in association with his or her account that indicates those tags for which media items are to be blocked and/or received. In this manner, media items that have been shared may be excluded from a receiving user's feed.

Since sharing preferences may be established prior to capture or uploading of media items, the sharing of these media items may occur immediately after the tagging of the photos is completed. As a result, media sharing may be nearly instant after the capture, uploading, or tagging of a visual media item. Furthermore, the media sharing may be performed automatically without manual intervention at or after the time of capture, uploading, or tagging.

Figures 4A, 4B:
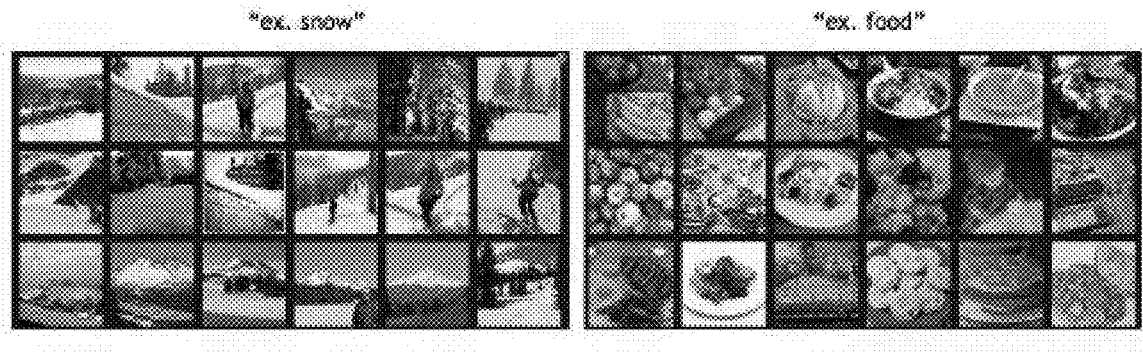
FIGS. 4A-4C are diagrams illustrating results of the implementation of a media sharing system in accordance with various embodiments.
Figure 4C:
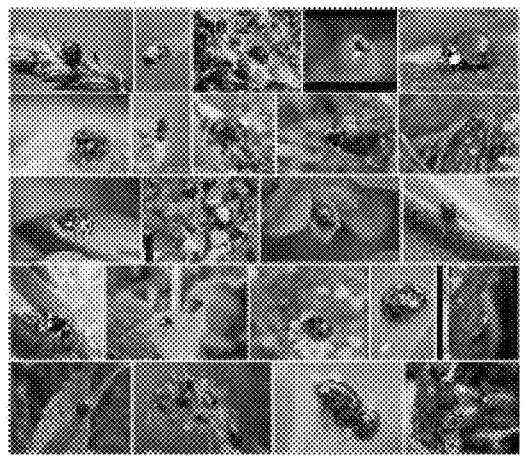

FIGS. 4A-4C are diagrams illustrating results of the implementation of a media sharing system in accordance with various embodiments. As shown in FIG. 4A, a set of sharing preferences indicates that media items tagged with the "tag" snow should be shared with a corresponding set of individuals. Photos that have been tagged with the tag "snow" are then shared with the set of individuals. Similarly, as shown in FIG. 4B, a set of sharing preferences indicates that media items tagged with the tag "food" should be shared with a corresponding set of individuals. Photos that have been tagged with the tag "food" are then shared with the set of individuals.

Media items may be shared by one or more users with a particular set of individuals. The media items shared by multiple users may be grouped according to user or presented in a combined fashion. As shown in FIG. 4C, the media items with the tag "ladybug" may have been shared by a single user or may include media items shared by multiple users.

The media items may be received via a variety of mechanisms including, but not limited to, a social networking application, web site, web service, electronic mail, text message, Internet television, or a media sharing application. In this example, a media sharing application installed on a client device receives a targeted stream of media items and displays them via a display of the client device. The client device may be a computer or mobile device such as a tablet or cell phone. The media items received via a media sharing application may be automatically displayed. Alternatively, the media sharing application may provide a notification of the receipt of a targeted stream of media items. For example, the notification may be a visual signal such as a blinking light, icon, or image. As another example, the signal may be an audio signal. A user may then choose to access the media sharing application on the client device to access the media items that have been received.

As described above, targeted media sharing may be performed based upon tag matching. In other embodiments, targeted media sharing may be performed based upon similar tags.

The tags associated with various media items may include manually generated tags and/or automatically generated tags. An example of a media sharing system for sharing media items having automatically generated tags will be described in further detail below.

Figure 5:
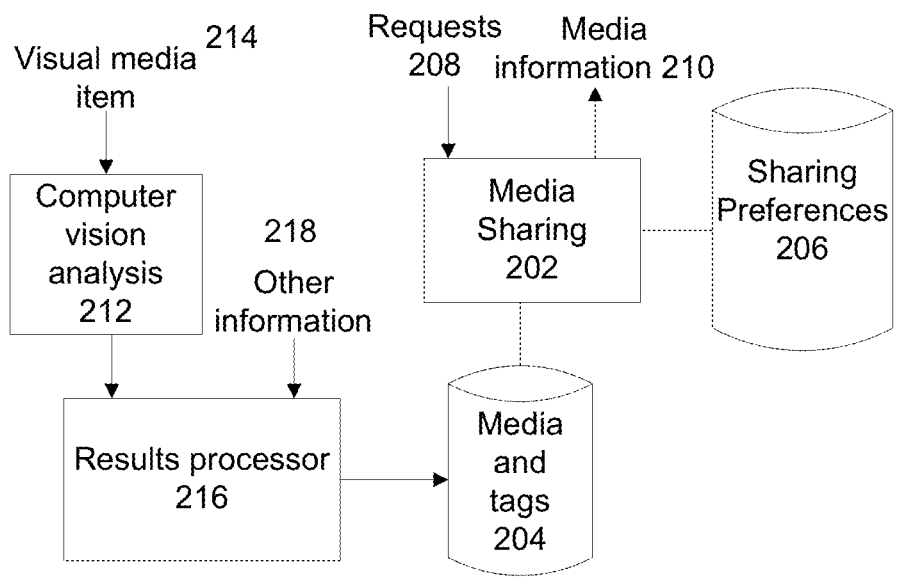
FIG. 5 is a block diagram illustrating an example system in which media sharing may be implemented according to automatically generated tags in accordance with various embodiments.

In accordance with various embodiments, the media sharing system may facilitate the sharing of visual media items. FIG. 5 is a block diagram illustrating an example system in which sharing of visual media items may be implemented according to automatically generated tags in accordance with various embodiments.

Computer vision analysis 212 may be performed for a visual media item 214 such as a photo or video to generate a set of tags. In addition, the computer vision analysis 212 may be performed such that each of the set of tags has a corresponding probability associated therewith, where the probability indicates a likelihood that the tag accurately describes image content of the visual media item. The computer vision analysis 212 may be performed at a time that the visual media item 214 is captured, at a time that the visual media item 214 is uploaded, or at a later time.

A results processor 216 may obtain the set of tags and probabilities associated therewith that has been generated via the computer vision analysis 212 and other information 218 that is independent from (e.g., external to) the image content of the visual media item 214. The results processor 216 may analyze the set of tags and the other information 218. Such analysis may include examining the interrelationships among the set of tags and the other information 218. The results processor 216 may revise the probabilities associated with the set of tags, thereby improving or refining the set of tags that was generated via computer vision analysis. In this manner, the accuracy of the automated tagging process is improved. The set of tags and associated probabilities may be stored to a tag database 208 in association with the visual media item 214. The results processor 216 may refine the set of tags for the visual media item 214 at the time that the visual media item 214 is captured, at the time that the visual media item 214 is uploaded, or at a later time.

Although the results processor 216 is shown in this example as a single entity, this example is merely illustrative. Therefore, the results processor 216 may be implemented via multiple processors or devices.

In accordance with some embodiments, a visual media item may be processed as described herein to generate a set of tags if the visual media item does not have tags associated therewith. As a result, if a visual media item has already been manually tagged, the system may not generate a set of tags for the visual media item. In accordance with other embodiments, a visual media item may be processed as described herein even if the visual media item already has tags associated therewith. In other words, it may be desirable to process a visual media item even if the visual media item has been previously processed or has been manually tagged. Thus, a set of automatically generated tags may be added to previously existing tags for a particular visual media item.

A user may also manually generate tag(s) associated with a visual media item at any time. Manually generated tags may be initialized with a particular probability. For example, manually generated tags may be assigned a probability of 100 percent, or may be assigned a probability score to supplement that generated via the computer vision analysis 212.

The visual media sharing system 202 may identify a set of one or more individuals that should receive information pertaining to the visual media item 214 based, at least in part, upon the set of tags associated with the visual media item and the sharing preferences 206. In addition, the visual media sharing system 202 may identify the set of individuals that should receive the information pertaining to the visual media item 214 further based, at least in part, upon the probabilities associated with the tags of the visual media items.

In some embodiments, the visual media sharing system 202 may access the tag database 204 to identify visual media items to be shared with a particular set of one or more individuals based, at least in part, upon the tags associated with the visual media and the sharing preferences 206. In addition, the visual media sharing system 202 may identify the visual media items to be shared with a particular set of individuals further based, at least in part, upon the probabilities associated with the tags of the visual media items. The tag database 204 may be implemented via one or more memories, which may be implemented locally (e.g., at the client) and/or remotely (e.g., at the server(s) or cloud).

Figure 6:
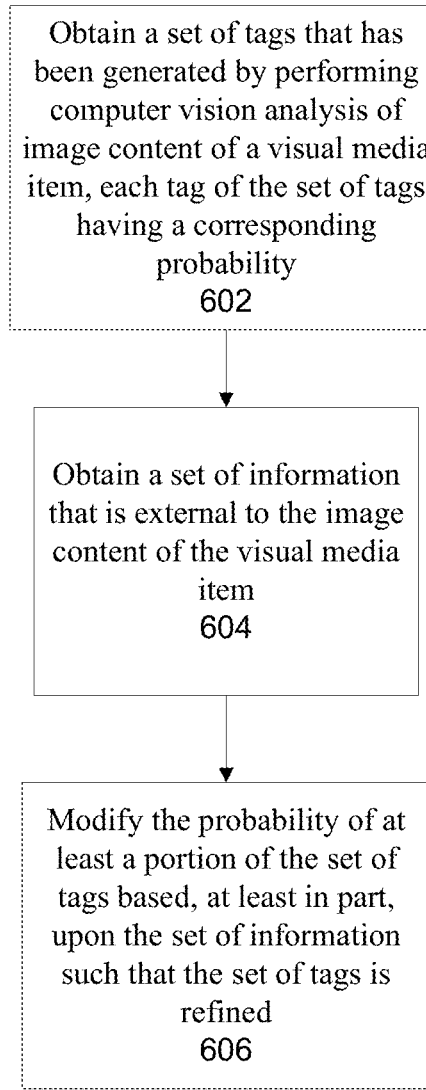
FIG. 6 is a process flow diagram illustrating an example method of tagging visual media items in accordance with various embodiments.

FIG. 6 is a process flow diagram illustrating an example method of tagging visual media items in accordance with various embodiments. A visual media item may be obtained or identified. For example, the visual media item may be captured, uploaded, retrieved from storage, or otherwise identified. Thus, the tagging process may be performed at the time of capture of the visual media item, at the time of uploading the visual media item, or at a later time (e.g., upon retrieval of the visual media item).

A set of tags that has been generated by performing computer vision analysis of image content of a visual media item may be obtained at 602, where each tag in the set of tags has a corresponding probability (i.e., weight) indicating a likelihood that the tag accurately describes or pertains to the image content of the visual media item. More particularly, the computer vision analysis of the image content of the visual media item may be performed to generate the set of tags (and corresponding probabilities) or, alternatively, may be performed (e.g., by another entity) prior to obtaining the set of tags (and corresponding probabilities). The set of tags may be stored in a tag database such that each tag is stored in association with the corresponding probability.

Computer vision analysis may be performed to detect objects and/or scenes within image content of the visual media item. Thus, each tag that is generated may identify an object represented in the visual media item or a scene describing the visual media item. For example, an object may include text, an item, a face, a person, a particular individual, or a group of individuals. A scene may include, but is not limited to, a theme, setting, location, area, or event.

A set of information that is independent from (e.g., external to) the image content of the visual media item may be obtained at 604. The set of information or portion thereof may be stored in association with the visual media item. In some instances, the set of information or portion thereof may be associated with a particular tag in the set of tags. Examples of various types of information that may be obtained will be described in further detail below.

The probability associated with at least a portion of the set of tags may be modified at 606 based, at least in part, upon the set of information such that the set of tags is refined. For example, the probability associated with a tag in the set of tags may be increased or decreased. Thus, the probability associated with one or more tags may be updated in the tag database. As a result, the modified probabilities may indicate whether the set of tags generated via the computer vision analysis is accurate, thereby improving the accuracy of the probabilities and tags. The set of tags may be stored in a tag database such that each tag is stored in association with a corresponding probability indicating a likelihood that the tag accurately describes or pertains to image content of the visual media item. In this manner, the probability of detection of objects or scenes may be improved by improving the accuracy of the probabilities associated with a set of tags generated via computer vision analysis.

In addition, the set of tags may also be modified by adding a further tag with a corresponding probability. For example, a location tag corresponding to a GPS location or a date may be added to the set of tags with a probability of 100 percent. Similarly, the set of tags may be modified by removing a tag from the set of tags. For example, where a modified probability associated with a given tag is lower than a minimum threshold amount, this may indicate that the tag is not relevant to the visual media item and the tag may be removed from the set of tags.

In some embodiments, the set of tags may be visible to users viewing the visual media item. In other embodiments, tags having a probability above a threshold amount (e.g., 80 percent) may be presented to a user viewing the visual media item, while tags having a probability below the threshold amount may not be presented to the user viewing the visual media item. In some embodiments, the probabilities associated with the tags may be displayed to users.

In some embodiments, the visual media items may be automatically organized (e.g., indexed) based, at least in part, upon the corresponding tags. In addition, the organization may be further based, at least in part, upon probabilities associated with the tags. The automated organization of visual media items may be performed according to various tags or metadata including, but not limited to, time, events, places, people, scenes, objects, text, and/or similarity. Such organization may facilitate efficient retrieval of the visual media items during browsing. In addition, the organization may enable a user to identify specific folder(s) via which to perform a visual media search. Moreover, the organization may facilitate the automated sharing of media items.

The processing described herein may be performed on a mobile device and/or a remotely located server. In some implementations, at least a portion of the processing may be performed by a software application installed on the mobile device. The visual media and associated metadata may be stored at one or more locations, which may include, but are not limited to, one or more mobile devices, computer memories, storage devices, service providers, and/or web-based services.

Computer Vision Analysis of Image Content of Visual Media Items

Computer vision analysis may be performed on image content of a visual media item using a variety of computer vision analysis techniques and software tools. Computer vision analysis techniques and tools may enable the image content of a visual media item to be analyzed such that a set of tags identifying objects and/or scenes in the visual media item is generated. Examples of such computer vision analysis techniques and tools will be described below.

Text detection and recognition may be performed on the visual media item to identify text characters via optical character recognition (OCR). For example, the location of text and/or a bounding box defining an area including the text may be ascertained. Text recognition may also be performed to recognize words such as "beach," "mountain," or "San Francisco" in the text characters. NLP may be performed to facilitate text recognition.

Barcode detection may be performed to detect a barcode within image content of a visual image. In addition, barcode recognition may be performed to ascertain a barcode number or otherwise perform barcode translation.

Facial analysis may be performed to detect a face (e.g., a person) or facial features such as a smile, frown, blink, red-eye, or orientation of a face detected in a visual media item. In addition, a number of faces (or people) in a visual media item, a location of faces (or people) within the visual media item, and/or a bounding box defining an area of the visual media item in which the face(s) (or people) are located may be ascertained.

Facial recognition may also be performed to recognize a particular face as a specific individual (e.g., John, Sarah, etc.). A probability may indicate a likelihood that the individual identified via facial analysis is accurate.

Object recognition may also be performed to identify objects in the visual media item. For example, the location of an object and/or a bounding box defining an area of the visual media item that includes the object may be ascertained. Objects may include items or entities such as cars or bicycles. In addition, objects may include people such as an individual or a group of individuals. A probability may indicate a likelihood that the object in the visual media item has been correctly identified.

Scene recognition may be performed to identify a scene of a visual media item. For example, a scene may be recognized as a beach or mountain. In addition, a probability may indicate a likelihood that the identified scene accurately describes the image content of the visual media item.

Color analysis may be performed to detect one or more colors in the image. More particularly, the color analysis may detect dominant colors in the image content. In some embodiments, the color analysis may ascertain locations of various colors in the image content. Moreover, the color analysis may determine that an object in the visual media item is a particular color. For example, the color analysis may determine that the visual media item includes a red car.

Quality analysis may also be performed to determine a quality of the visual media item. For example, the quality analysis may determine whether a photo is blurry or has a limited amount of contrast. The quality analysis may be used to estimate a probability that a tag generated via the computer vision analysis accurately describes the corresponding object or scene. Where the quality analysis determines that the quality of an image in the visual media item is low, one or more tags that have been generated may be assigned a low probability of accuracy. For example, where the photo is significantly blurry, the probability that a given tag is accurate may be set to 20%.

Information External to Image Content of Visual Media Items

Various types of information may be obtained to refine a set of tags generated via computer vision analysis. More particularly, one or more types of information may be applied separately or in combination to modify a set of tags generated via computer vision analysis (e.g., by modifying probabilities associated with at least a portion of the set of tags), as appropriate. Examples of types of information that may be applied to modify tag probabilities will be described in further detail below.

Metadata

When visual media such as photos are captured via a camera, the visual media are often automatically tagged with metadata such as a time or location. However, as photos are copied, cropped, or transferred, this metadata is often lost.

In accordance with various embodiments, metadata that is automatically captured by a mobile device including a camera may be leveraged to further refine automated tags generated via computer vision analysis. The metadata may include, but is not limited to, an indication of a particular geographic location, a date, and/or a time at which the visual media item was captured. For example, the geographic location may include a particular city, state, and/or country. As another example, the date may identify a particular day, month, and/or year. The metadata may also indicate an identity of an object or individual in a vicinity of the mobile device at the time that the mobile device captured the visual media item The metadata may also include Exchangeable Image File (EXIF) data. Mobile devices including a digital camera typically record EXIF data with each image that is captured. The EXIF data may indicate an exact time and date that a photo was captured. In addition, the EXIF data may also indicate information such as the orientation of the image, the camera type, and settings such as aperture, focal length, whether the flash was on at the time that the image was captured, and whether the flash was fired at the time that the image was captured.

In addition, metadata may be acquired via one or more sensors of a mobile device at a time that the mobile device captured the visual media item. Such sensors may include, for example, Infra-red (IR) sensors, Radio Frequency Identifier (RFID) sensors, accelerometers, and/or Global Positioning System (GPS) sensors. Thus, the metadata may indicate an orientation of the mobile device and/or sound detected via the mobile device.

Sensors

Figure 7A:
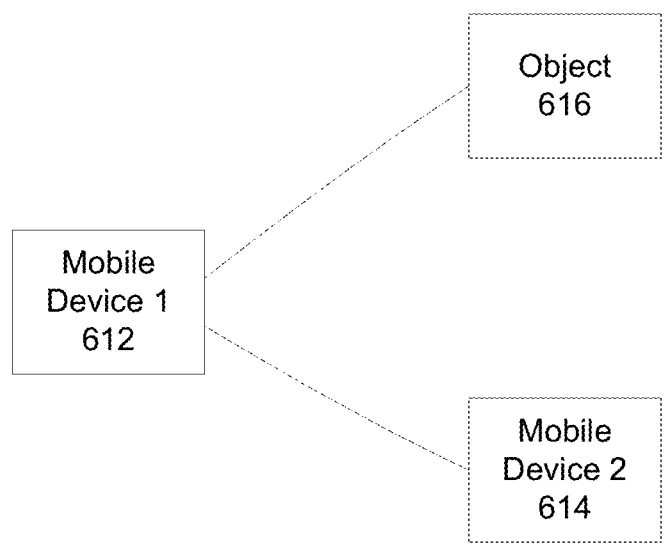
FIG. 7A is a diagram illustrating the use of metadata obtained via sensors of a mobile device in accordance with various embodiments.

FIG. 7A is a diagram illustrating the use of metadata obtained via sensors of a mobile device in accordance with various embodiments. As shown in this example, a first mobile device 612 having a camera may capture a visual media item such as a photo or video clip. Other objects or devices may emit signals that may be used to uniquely identify the objects or devices. Using such signals, it is possible to verify whether tags generated via computer vision analysis are accurate. More particularly, the signals may be used to "boost" probabilities associated with various tags.

For example, the first mobile device 612 may take a first photo of Person A who has a second mobile device 614 that emits a first signal such as an IR or RFID signal. The first mobile device 612 may sense the first signal at the time that the first photo is taken. Where a set of tags is generated via computer vision analysis, one of the tags may identify Person A with a probability of 62%. Based upon the first signal, the first mobile device 612 may sense that the second mobile device 614 is Person A's mobile device. As a result, the probability associated with this tag may be increased from 62% to 100%. In this manner, the results of facial recognition that has been performed may be "boosted." Accordingly, the accuracy of detection of individuals in a visual media item and corresponding tag generation may be improved.

As another example, the first mobile device 612 may take a second photo of an Object 616 that emits a second signal such as a RFID signal. The first mobile device 612 may sense the second signal at the time that the second photo is taken. Since the second signal indicates that the Object 616 is a traffic light, the second signal may be used to modify the probability associated with a tag identifying the Object 616. For example, where the tag previously identified a utility pole with a probability of 50% and the second signal indicates that the Object 406 is a traffic light, the probability associated with the tag may be reduced to a probability of 20%. In this manner, object detection accuracy may be improved in a variety of environments where objects emit signals via RFID tags or other technology.

Location

A Global Positioning System (GPS) may determine GPS coordinates identifying a location of a mobile device at the time that a visual media item is captured via a camera of the mobile device. The GPS coordinates may be used to refine a set of tags generated via computer vision analysis. More particularly, the probabilities associated with at least one of the set of tags may be modified based, at least in part, upon the GPS coordinates. For example, the GPS coordinates may be translated into a multiplier, which may be multiplied by the probability associated with a tag.

The location at which the visual media item was captured may be used to improve the probability of scene or object recognition accuracy. For example, where a visual media item is a photo of a beach, computer vision analysis may ascertain that the probability associated with a tag "beach" is 56 percent. If the location is near the ocean, the probability associated with the tag "beach" may be increased to 80 percent. As another example, where a tag generated via computer vision analysis is "baseball" and the location is a stadium, the probability associated with the tag may be increased. Accordingly, the probability of scene or object recognition accuracy may be increased based, at least in part, upon the location at which the visual media item was captured.

Figure 7B:
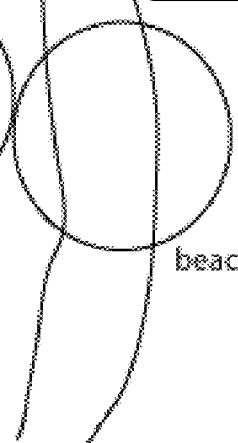
FIG. 7B is a diagram illustrating an example system in which coordinates may be used to modify tag probabilities in accordance with various embodiments.
Figure 7B:
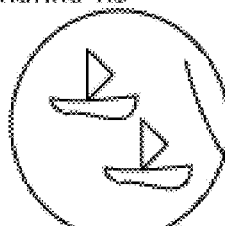
Figure 7B:
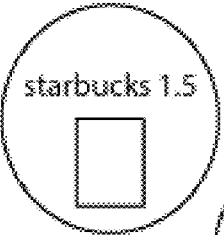
Figure 7B:
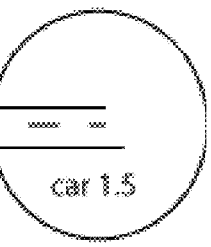
Figure 7B:

FIG. 7B is a diagram illustrating an example system in which coordinates may be used to modify tag probabilities in accordance with various embodiments. As shown in this example, a map may be used to ascertain which location on the map the coordinates identify. At least one of the set of tags generated by a computer vision analysis system may be modified based, at least in part, upon whether the tag(s) are likely to be accurate given the particular location at which the visual media item was captured. For example, the GPS coordinates may identify a marina, an ocean, a beach, a street, or Starbucks coffee shop. If a visual media item such as a photo is taken on a street, the object that is tagged by a computer vision analysis system as a car is more likely to be a car than an ocean.

EXIF Data and Tags

The date and/or time at which a visual media item has been captured may be particularly useful where two or more visual media items have been captured via a mobile device within a particular threshold period of time. More particularly, if the EXIF data or other metadata indicates that two visual media items were captured within a particular predefined threshold period of time from one another, it is more likely that a tag of one of the two visual media items may pertain to the other media item.

Where a first one of the visual media items has been manually tagged by a user with one or more tags and a second one of the visual media items has not been manually tagged by the user, the tags associated with the first visual media item may be obtained to further refine the set of tags of the second visual media item that has been generated via computer vision analysis. For example, where a first photo has been tagged with the event "Mary's wedding," it is likely that a second photo taken 5 minutes later also pertains to "Mary's wedding." Thus, the manually generated tags of a first visual media item may be used to boost results of computer vision analysis of a second visual media item.

Similarly, where a first one of the visual media items has a tag with a relatively high probability (e.g., 90 percent), the tag may be useful in further refining tags of a second one of the visual media items, where both of the visual media items have been captured within a particular threshold period of time within one another. For example, consider two different photos taken 5 minutes apart, but the second photo is slightly blurry. Where a first set of tags that is computer generated for the first photo includes a tag "Person A" with a probability of 90 percent and a second set of tags that is computer generated for the second photo includes a tag "Person A" with a probability of 50 percent, the probability associated with the tag "Person A" may be increased to 90 percent for the second photo.

As discussed above, tag probabilities associated with visual media items captured within a particular threshold period of time from one another may be propagated or combined. The tags may be manually or automatically generated. For example, the tags may identify events, people, or other suitable labels.

Similarity Analysis

Similarity analysis may be performed to identify two or more visual media items that are visually similar. More particularly, computer vision analysis may identify visual characteristics that are shared between the visual media item and the other media items. Thus, it is possible to identify visual media items depicting the same or similar scenes or objects.

In some embodiments, a similarity weight may be assigned to other visual media items, where a similarity weight indicates a degree with which another visual media item is similar to the visual media item. A set of visual media items that are most visually similar to the visual media item may be identified by ranking visual media items according to their similarity weights. In some embodiments, visual media items are considered to be visually similar to another visual media item if its similarity weight is above a predefined similarity threshold. In this manner, computer vision analysis may be performed with respect to a visual media item and other visual media items to identify a set of visual media items that are visually similar to the visual media item.

A set of tags associated with each similar visual media item in the set of visually similar media items may be ascertained, where each tag of the set of tags associated with a similar visual media item has a corresponding probability. Where a tag in the set of tags has a high probability of being accurate, the probability of a corresponding tag (e.g., identical or similar tag) associated with the visual media item may be modified (e.g., by increasing the probability associated with the tag of the visual media item). For example, where a first photo has been tagged by a user with the tag "baseball" and a second photo that is visually similar has been tagged via computer vision analysis with the tag "baseball" with a probability of 50 percent, the probability may be increased to 80 percent. Accordingly, the tags (and associated probabilities) of other visual media items may be used to further boost results of computer vision analysis of a particular visual media item if the other visual media items are deemed to be visually similar to the particular visual media item.

Figure 7C:
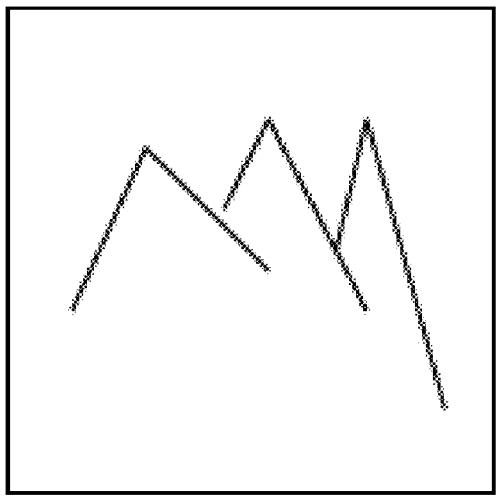
FIG. 7C is a diagram illustrating the identification of visually similar visual items in accordance with various embodiments.
Figure 7C:
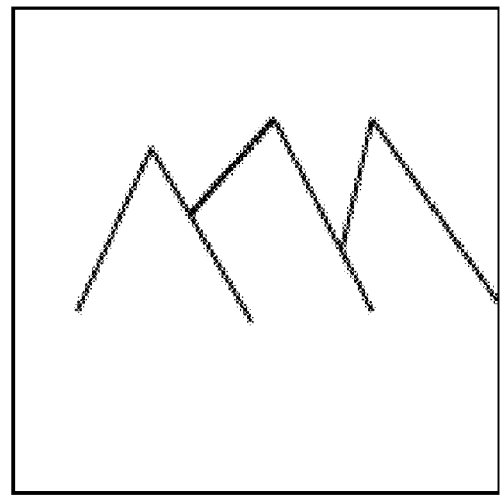

FIG. 7C is a diagram illustrating the identification of visually similar visual items in accordance with various embodiments. In this example, a user may tag a first photo with the text "Eiger," which is a mountain in the Alps. It may be determined that the first photo and a second photo are visually similar. As shown in this example, computer vision analysis may generate a similarity weight 0.85 and a tag "Eiger" having a corresponding probability 0.85 for the second photo. The tag probability associated with the second photo may be increased (e.g., to 0.95) due to its similarity to the first tagged photo.

Feature Learning and User Tags

Figure 7D:
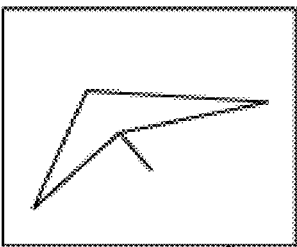
FIG. 7D is a block diagram illustrating an example application of unsupervised feature learning.
Figure 7D:
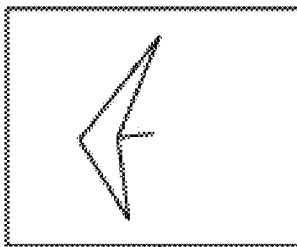
Figure 7D:
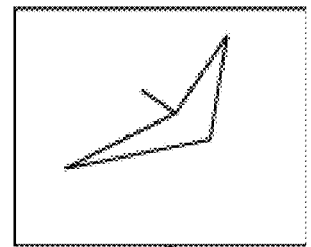

During computer vision analysis, unsupervised and/or supervised feature learning may be performed to train a computer-implemented model to identify specific objects or scenes. FIG. 7D is a block diagram illustrating an example application of unsupervised feature learning. As shown in this example, a user may tag one or more photos with a tag "hang glider." By performing computer vision analysis, the system is able to determine that the manually tagged photo(s) share visual features with other untagged photo(s). Where a manually tagged visual media item is ascertained to be visually similar to other untagged visual media item(s), the manually generated tag(s) may be used by the system to improve its ability to detect objects or scenes based upon their visual features. Specifically, the system may maintain a list of objects and/or scenes, where each object or scene is associated visual features of the corresponding object or scene. In this example, the system may improve its ability to accurately identify visual media items that depict a hang glider and the probability weight of the tag "hang glider" generated via computer vision analysis may be improved. In this manner, the system may improve its ability to identify, via computer vision analysis, an object or scene in an untagged visual media item through the use of manually generated tags associated with other visual media items.

Social Tags and Comments

Social tags and comments may also be used to refine tags generated via computer vision analysis. For example, if a user posts a comment pertaining to a visual media item or adds a further tag to a visual media item, these may be used to refine tags that are generated via computer vision analysis.

User Data

User data such as that maintained in a user profile may be leveraged to further refine results of computer vision analysis. For example, where the profile indicates that the user is interested in fishing and a tag "fishing" has been generated for a visual media item via computer vision analysis with a probability of 40 percent for one of the user's photos, the probability may be increased since it is particularly likely that the user did go fishing. Accordingly, user profile data such as user interests may be used to modify probabilities of tags that have been generated via computer vision analysis.

Calendar

A calendar may also be useful in refining tags generated via a computer vision analysis system. A calendar may indicate a date, time and/or location of one or more events. The calendar may be a calendar of the user, a group of users, or other calendar that may be publicly available. At least a portion of the information that is independent from the image content may be retrieved from a calendar. In some embodiments, a look up in one or more calendars may be performed to attempt to identify an event on the date and/or time at which the visual media item was captured. Once an event has been identified, probabilities associated with tag(s) in the computer-generated set of tags may be modified based, at least in part, upon the identified event. More particularly, a tag probability associated with an event may be increased if the visual media item has been captured during the event. Such an event may be a scheduled event, birthday, or other holiday. For example, during Christmas, the probability associated with the tag "Christmas tree" may be increased by a particular amount.

For example, suppose the computer vision analysis system generates a tag identifying a baseball game with a probability of 50 percent for a particular photo. A lookup in the user's calendar on the date that the photo was taken may indicate that the user planned to go to the baseball game on that day. In this instance, the probability associated with the tag "baseball game" may be increased to 90 percent.

As another example, suppose the computer vision analysis system generates a tag "snow" with a probability of 50 percent. If the user's calendar indicates that the user was going skiing on that day, the probability may be increased to 70 percent.

Tag Expansion

Tags may be automatically generated to expand upon tags generated via computer vision analysis or manually generated tags. For example, if a scene has been tagged as a "dog," an additional tag "animal" may be automatically generated. Automated tag expansion may be performed using various databases such as a dictionary, thesaurus, or other databases.

User Feedback

In accordance with various embodiments, a graphical user interface may provide a user input feature that enables a user to provide feedback pertaining to the accuracy of a corresponding tag. For example, the input feature may enable the user to indicate that the tag is accurate when in a first state and inaccurate when in a second state. Such feedback may be used to modify a probability associated with the corresponding tag. In this example, the probability may be modified to 100 percent if the user indicates that the tag is accurate or 0 percent if the user indicates that the tag is inaccurate. The feedback may also be used to train the computer visual analysis system, as described above.

In addition, crowd-sourcing may be implemented to further increase the accuracy of automatically generated tags. The results of crowd-sourcing may further improve automated system feature learning.

Through the disclosed embodiments, it is possible to facilitate the targeted sharing of media items. By mapping sets of users to sharing preferences, it is possible to target the sharing of media items according to users' interests. In some embodiments, targeted sharing is performed based, at least in part, upon automatically generated tags. By increasing the accuracy with which automated tagging is performed, it is possible for a media sharing system to efficiently and correctly identify media items to be shared. Furthermore, media sharing may be automated, eliminating the need for users to manually select media items to share with their friends or relatives.

It is important to note that the above-described embodiments are merely illustrative. For example, while many of the examples described herein increase the probabilities associated with tags, it is important to note that the probabilities may also be decreased. Furthermore, the additional information that is analyzed may result in the elimination of a tag associated with a visual media item, as well as the addition of a tag associated with a visual media item.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing,"

distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 8:
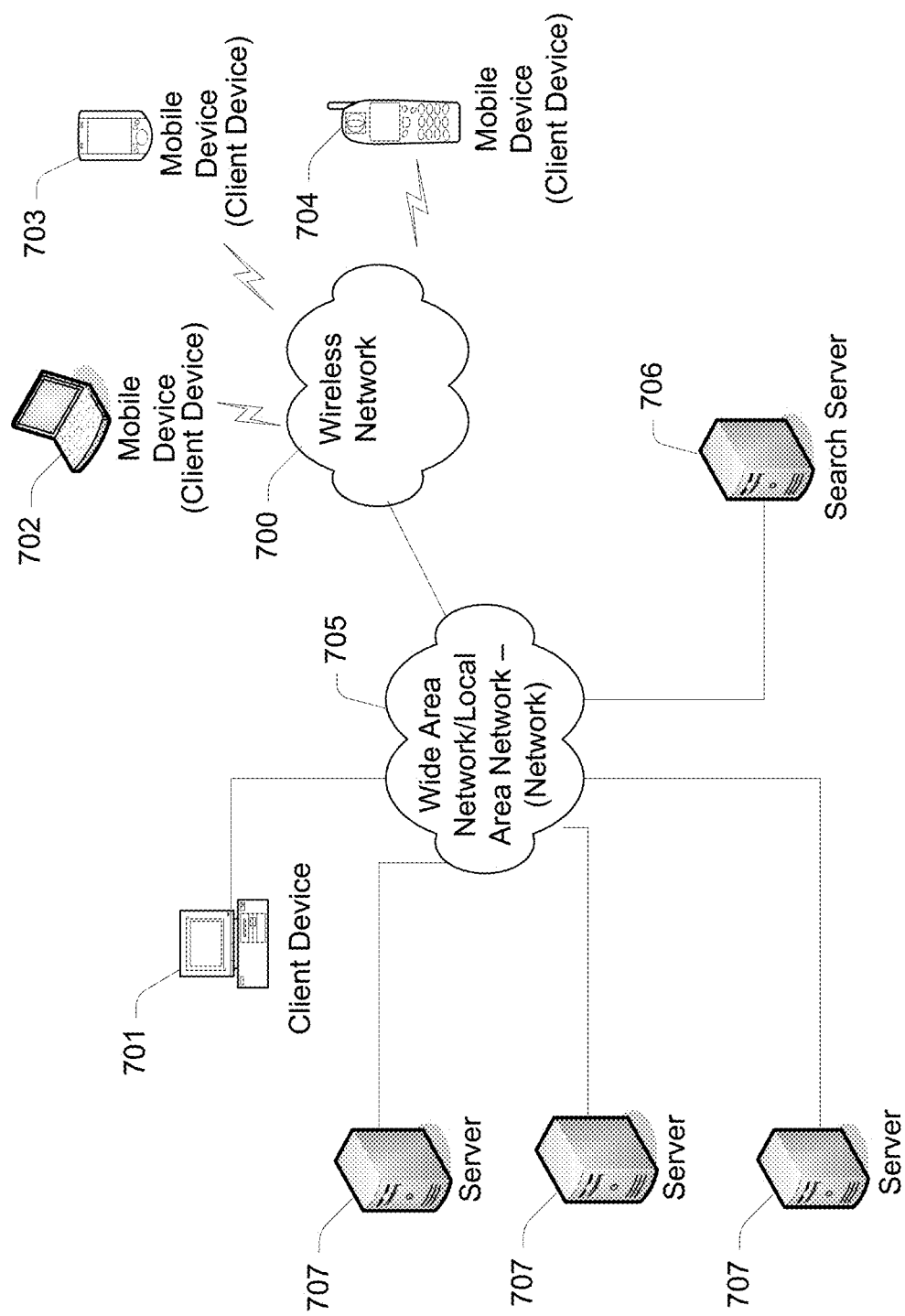
FIG. 8 is a schematic diagram illustrating an example embodiment of a network in which various embodiments may be implemented.

The disclosed embodiments may be implemented in any of a wide variety of computing contexts. FIG. 8 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 8, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 8 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 9:
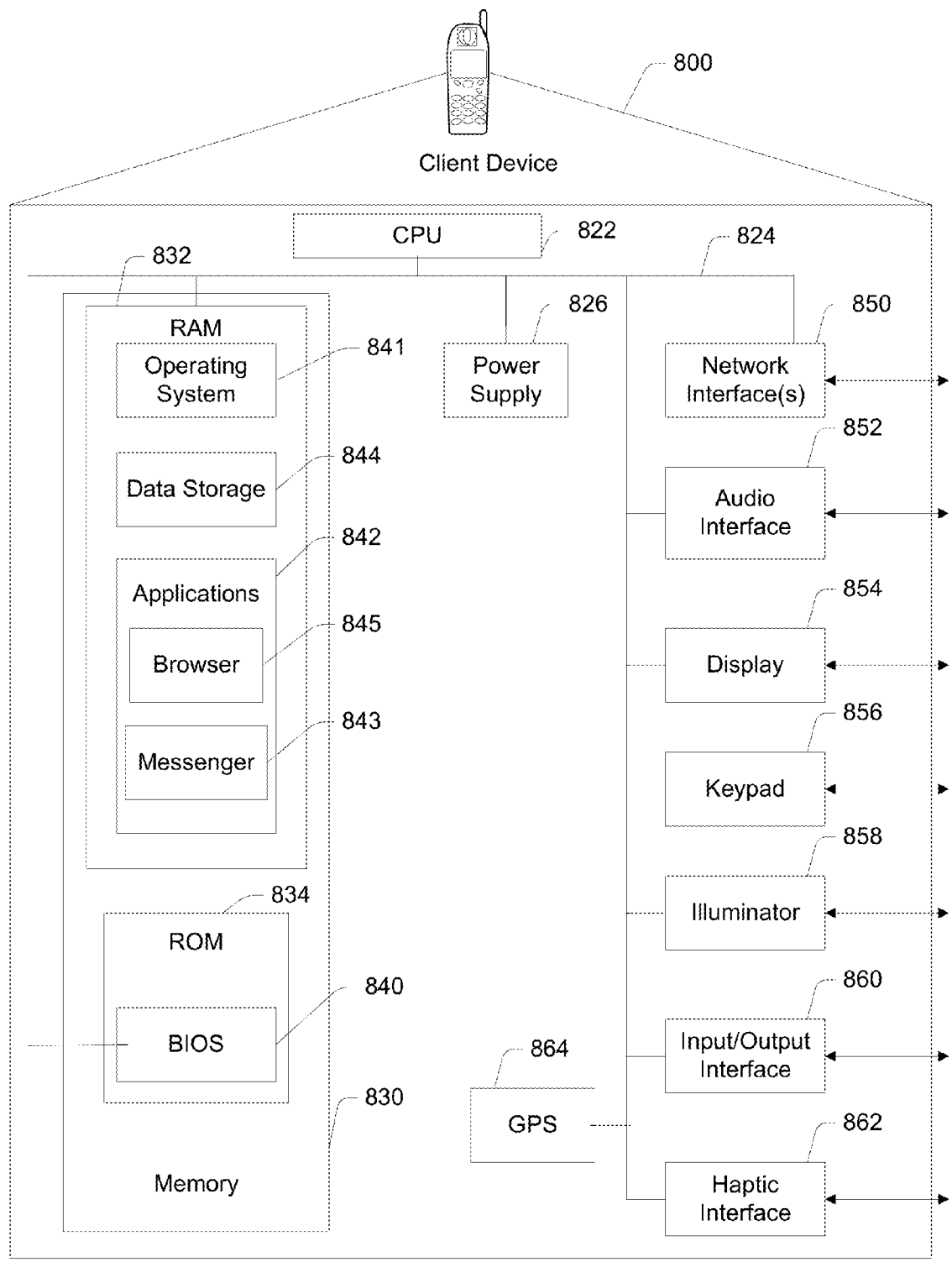
FIG. 9 is a schematic diagram illustrating an example client device in which various embodiments may be implemented.

FIG. 9 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may transmit and detect patterns, images, or signals such as infra-red signals via the interface(s). Such patterns, images, or signals may uniquely identify a particular object (e.g., individual or item). For example, the client device 800 may transmit an infra-red blink pattern identifying a particular object, as well as detect an infra-red blink pattern.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Figure 10:
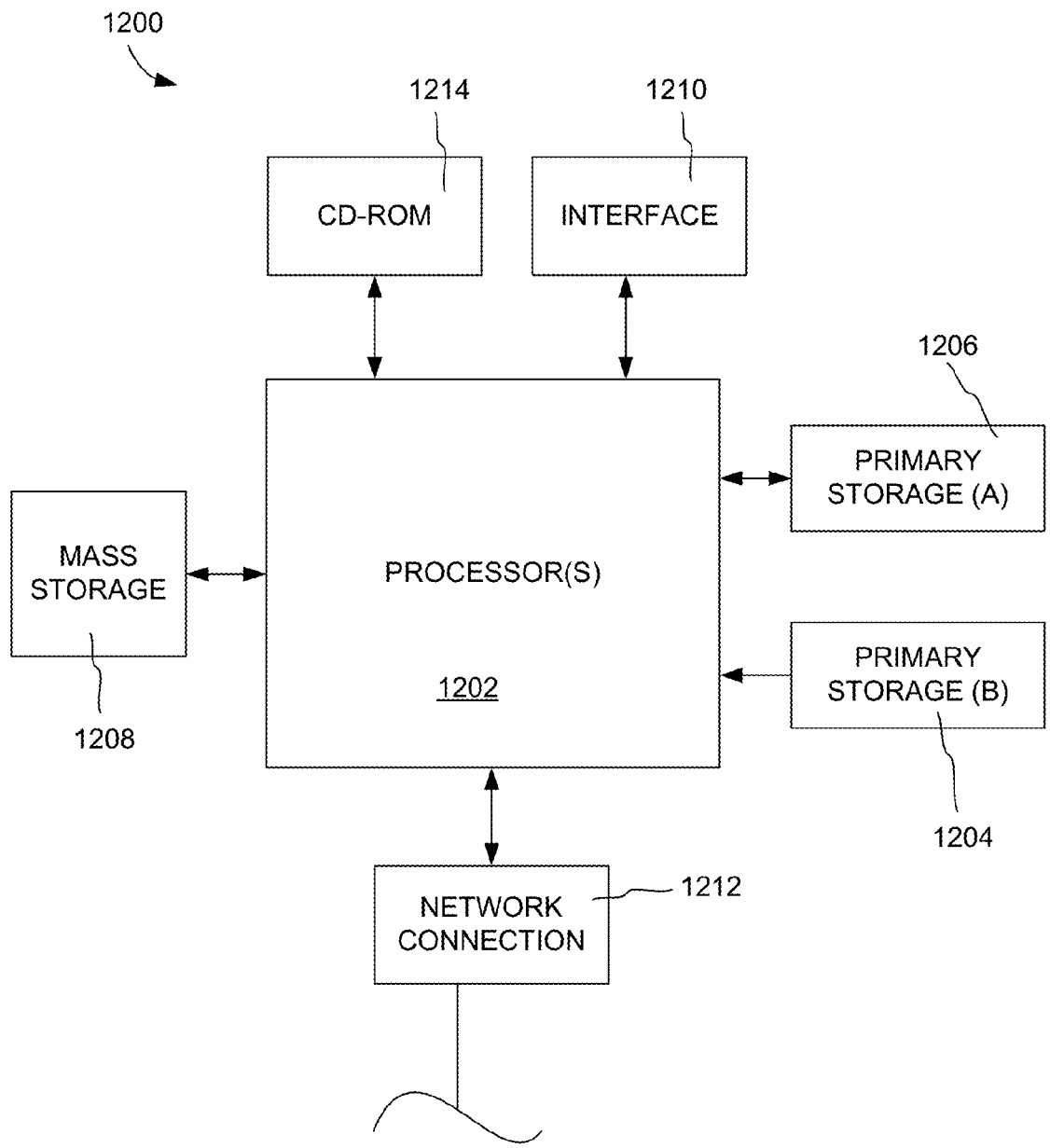
FIG. 10 is a schematic diagram illustrating an example computer system in which various embodiments may be implemented.

FIG. 10 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising
ascertaining, by at least one computing device, a set of tags associated with a media item stored in a memory;
receiving, by the at least one computing device via a network, a share request from a computing device associated with an individual in one of a plurality of sets of individuals, each set of individuals being associated with a corresponding one of a plurality of sets of sharing preferences, each one of the plurality of sets of sharing preferences indicating tags for which media items are to be shared with the corresponding one of the plurality of sets of individuals, wherein each of the sets of individuals includes one or more individuals, the share request indicating a request to receive media items that satisfy the set of sharing preferences associated with the set of individuals, at least one of the tags indicating an interest of the set of individuals;
updating, by the at least one computing device, the set of sharing preferences associated with the set of individuals including the individual according to the share request;
identifying, by the at least one computing device, one or more of the plurality of sets of individuals to whom the media item is to be transmitted based, at least in part, upon the set of tags associated with the media item and the plurality of sets of sharing preferences; and
responsive to identifying the one or more of the plurality of sets of individuals to whom the media item is to be transmitted, transmitting, by the at least one computing device via a network, the media item to one or more computing devices associated with each of the identified sets of individuals;
the at least one computing device including a server or a mobile device.

2. The method as recited in claim 1, wherein ascertaining a set of tags comprises:
automatically generating at least a portion of the set of tags.

3. The method as recited in claim 1, further comprising:
receiving input via a user interface, the input indicating one or more tags associated with the media item.

4. The method as recited in claim 1, wherein ascertaining, identifying, and transmitting are performed automatically in response to capturing the media item, uploading the media item, or tagging the media item.

5. The method as recited in claim 1, wherein the media item comprises a visual media item.

6. The method as recited in claim 1, the share request indicating that the individual wishes to block the receipt of media items associated with one or more specified tags.

7. The method as recited in claim 1,
wherein receiving the share request comprises receiving input via a graphical user interface.

8. The method as recited in claim 1, wherein the one or more computing devices comprise one or more mobile devices.

9. The method as recited in claim 1, wherein ascertaining, identifying, and transmitting are performed by a mobile device.

10. The method as recited in claim 9, wherein transmitting the media item to the identified sets of individuals comprises:
transmitting the media item to a second mobile device.

11. The method as recited in claim 1, at least one of the plurality of sets of sharing preferences indicating a periodicity at which media items are to be identified and transmitted.

12. The method as recited in claim 1, the media content item being a photograph and the set of tags associated with the media item being descriptive of at least one object represented in the photograph.

13. An apparatus, comprising:
a processor; and
a memory, at least one of the processor or the memory being adapted for:
receiving via a network, from a computing device associated with an individual in a set of one or more individuals, a share request indicating a request to receive media items that satisfy a set of sharing preferences, the set of sharing preferences indicating tags for which media items are to be shared with the set of one or more individuals, at least one of the tags indicating an interest of the individual;
storing, in the memory, information indicating the set of sharing preferences in association with the set of individuals;
identifying one or more of a plurality of media items stored in the memory based, at least in part, upon the set of sharing preferences and tags associated with the plurality of media items; and
responsive to identifying the one or more of the plurality of media items, transmitting the identified media items to one or more computing devices associated with the set of one or more individuals;
wherein the apparatus is a mobile device or server.

14. The apparatus as recited in claim 13, wherein the obtaining, identifying, and transmitting are performed automatically.

15. The apparatus as recited in claim 13, wherein the obtaining, identifying, and transmitting are performed in response to a request.

16. The apparatus as recited in claim 13, wherein the plurality of media items comprise visual media items.

17. The apparatus as recited in claim 13, wherein the identified media items are transmitted to one or more mobile devices.

18. The apparatus as recited in claim 13, wherein the apparatus is a first mobile device and wherein the media item is transmitted to the second mobile device, the memory being internal to the first mobile device.

19. A non-transitory computer-readable medium storing thereon computer-readable instructions for performing operations, comprising:
ascertaining a set of tags associated with a media item stored in memory;
determining whether to share the media item with a set of one or more individuals based, at least in part, upon the set of tags associated with the media item and a set of sharing preferences associated with the set of individuals, the set of sharing preferences indicating tags for which media items are to be shared with the set of individuals, the set of sharing preferences including a sharing preference received from an individual in the set of individuals, at least one of the tags indicating an interest of the set of individuals; and
transmitting the media item, via a network, to at least one computing device associated with the set of individuals according to a result of the determining;
wherein ascertaining, determining, and transmitting are performed by a server or a mobile device.

20. The non-transitory computer-readable medium as recited in claim 19, wherein ascertaining, determining, and transmitting are performed automatically by a mobile device in response to capturing the media item by the mobile device.

* * * * *